W. C. KROEGHER.
POWER TRANSMISSION DEVICE.
APPLICATION FILED JAN. 21, 1914.

1,161,055.

Patented Nov. 23, 1915.

WITNESSES
Samuel Payne.
Max H. Frolenty

INVENTOR
W. C. Kroegher.
BY Henry C. Evert
ATTORNEY

UNITED STATES PATENT OFFICE.

WILLIAM C. KROEGHER, OF BELLEVUE, PENNSYLVANIA.

POWER-TRANSMISSION DEVICE.

1,161,055.  Specification of Letters Patent.  Patented Nov. 23, 1915.

Application filed January 21, 1914. Serial No. 813,532.

*To all whom it may concern:*

Be it known that I, WILLIAM C. KROEGHER, a citizen of the United States of America, residing at Bellevue, in the county of Allegheny and State of Pennsylvania, have invented certain new and useful Improvements in Power - Transmission Devices, of which the following is a specification, reference being had therein to the accompanying drawing.

This invention relates to a power transmission device, and has for its object to provide means, in a manner as hereinafter, including a semispherical duplex gear for transmitting motion from a drive to a driven member, said gear being utilized not only for operating the driven element forwardly but also rearwardly when occasion so requires.

Further objects of the invention are to provide a power transmitting mechanism which is simple in its construction and arrangement, compact, strong, durable, efficient and convenient in its use, readily set up and inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

Figure 1:
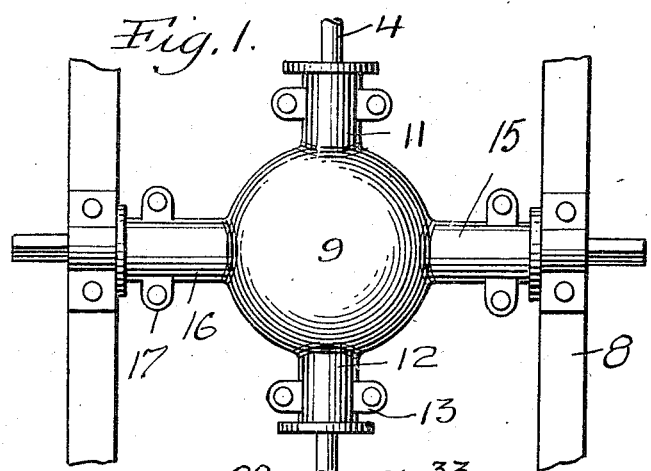
Figure 2:
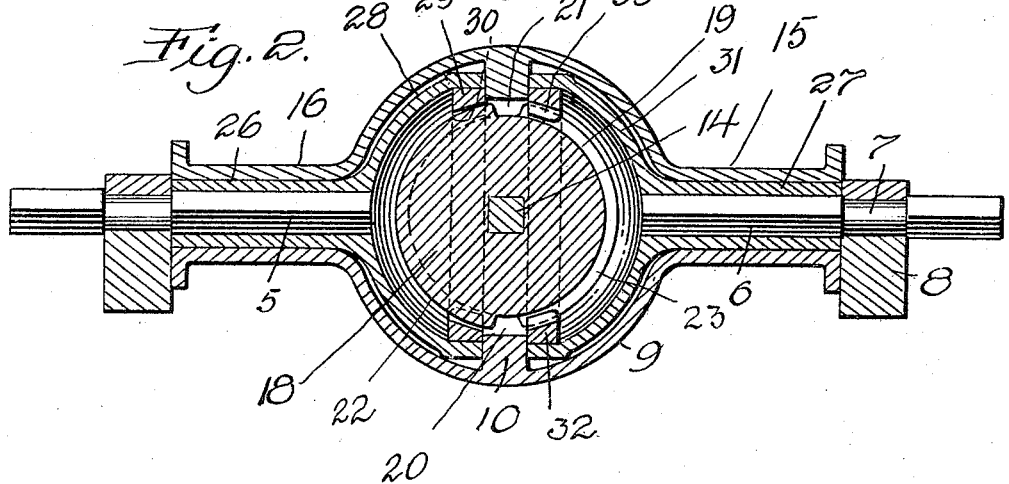
Figure 3:
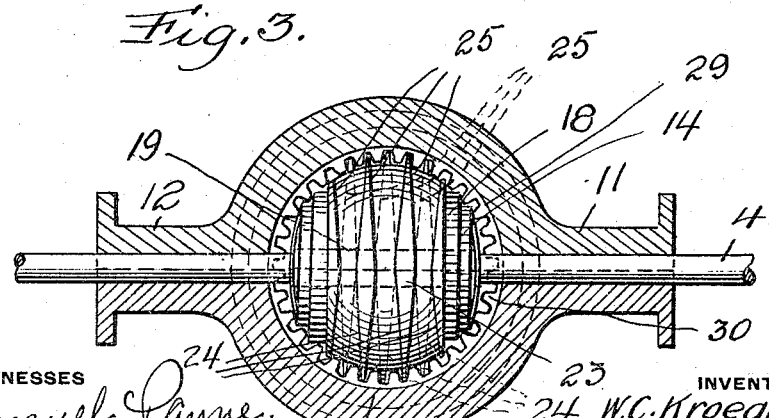

In the drawings wherein like reference characters denote corresponding parts throughout the several views:—Figure 1 is a top plan view of a power transmitting device in accordance with this invention, Fig. 2 is a cross sectional view showing the device in connection with a driven element, and Fig. 3 is a cross sectional view taken at right angles to Fig. 2.

Referring to the drawings in detail. 4 denotes a drive element in the form of a longitudinally extending shaft and which is illustrated by way of example, as driving an axle comprising two sections, the sections being indicated at 5 and 6 and which extend in opposite directions with respect to each other and each of which is journaled as at 7 in a bearing 8, and projecting therefrom.

The reference character 9 denotes a spherical casing formed on its inner face with a vertically disposed integral continuous annular flange 10. Formed integral with and opening into the interior of the casing 9, is a pair of longitudinally extending bearing sleeves 11 and 12, which are disposed in opposite directions with respect to each other and each of which is formed with apertured flanges 13. The sleeves 11 and 12 provide bearings for the shaft 4, the latter extends through the casing 9 and within the casing is formed with a square portion 14 for a purpose to be presently referred to. The casing 9 is furthermore provided with a pair of bearing sleeves 15 and 16, which open into the interior of said casing 9 and are disposed at right angles with respect to the sleeves 11 and 12. The sleeves 15 and 16 extend in opposite directions with respect to each other and are provided with apertured flanges 17.

Fixedly secured upon the square portion 14 of the shaft 4 is a gear consisting of a spherical body portion 18, the periphery thereof being spirally grooved as at 19 and also circumferentially grooved as at 20 and 21, whereby to form two sets of teeth 22 and 23 respectively. These teeth gradually increase in width from each end inwardly for a portion of their length, one portion or side of each tooth beyond the center being indicated at 24 and the opposite portion or side thereof indicated at 25. This construction is such that the portion or side 24 of a tooth in one set will, when the gear revolves, form substantially a continuation of the portion or side 25 of a corresponding tooth in the other set, and vice versa.

By providing the teeth in the manner set forth, that is, with each side or portion of a tooth having two tapered portions and with the tapered portions of the teeth of the sets being disposed in a manner as stated, two driving sets of sides are set up, one for operating the driven member in one direction and one for operating the driven member in a reversed direction. The tapered portions 24 of the teeth are utilized for operating the driven member forward, while the portions 25 are employed to operate said driven member in the reversed direction.

The reference characters 26 and 27 denote a pair of oppositely extending coupling sleeves to which are secured respectively the axle sections 5 and 6. Formed integral with the inner end of the sleeve 26 is the semispherical member 28 which is arranged within the casing 9 and extends to each side of the flange 10, and which has secured to its inner face a circular member 29 provided on its inner face with transverse teeth throughout and formed integral with the inner end of the sleeve 7 is a semi-spherical member 31, the latter being arranged within the casing 9 and extends to the other side of the flange 10. Secured to the inner face of the member 31 is a circular member 32 having its inner face provided throughout with transverse teeth 33. The sleeves 26 and 27 are mounted in the bearings 16 and 15 respectively.

When the gear is revolved through the medium of the shaft 4 in one direction, the teeth 22 and 23 will engage the racks formed by the members 29 and 32 and will revolve the coupling members 26 and 27, and as these latter are fixed to the axle sections 5 and 6, the axle sections will be revolved forwardly, it being assumed that the inclined portions 24 are active. A reverse operation of the driving element is had when the gear is revolved in the opposite direction as the inclined portions 25 are active.

The body portion 19 is of such diameter that during the operation thereof that portion which is not toothed will bear against the circular members 29 and 32. The setting up of the spherical gear of the diameter as stated so that it will bear against the members 29 and 32, will prevent any shifting of the gear from normal position when the gear is operated.

What I claim is:—

1. A power transmission device comprising a toothed driven element and a driving element therefor, said driving element comprising a spherical gear having its periphery formed with two sets of teeth, said teeth engaging with said element for driving it, the ends of the teeth of one set being staggered with respect to the ends of the teeth of the other set.

2. A power transmission device comprising a toothed driven element and a driving element therefor, said driving element comprising a spherical gear having its periphery formed with two sets of teeth, said teeth engaging with said element for driving it, the ends of the teeth of one set being staggered with respect to the ends of the teeth of the other set, each of the teeth of each of said sets gradually increasing in width from each end toward the center.

3. A power transmission mechanism comprising a driving element including a spherical gear having its periphery provided with two sets of teeth, the teeth of each set gradually increasing in width from each end toward the center thereby providing an inclined side, the teeth of one set being staggered with respect to the teeth of the other set.

In testimony whereof I affix my signature in the presence of two witnesses.

WILLIAM C. KROEGHER.

Witnesses:
Max H. Srolovitz,
Henry C. Evert.